United States Patent [19]

Bates

[11] Patent Number: 6,049,667

[45] Date of Patent: Apr. 11, 2000

[54] COMPUTER SYSTEM, METHOD OF COMPILING AND METHOD OF ACCESSING ADDRESS SPACE WITH POINTER OF DIFFERENT WIDTH THEREFROM

[75] Inventor: Cary Lee Bates, Rochester, Minn.

[73] Assignee: International Business Machines Corporation, Armonk, N.Y.

[21] Appl. No.: 08/911,899

[22] Filed: Aug. 15, 1997

[51] Int. Cl.$^7$ .................................................. G06F 9/445
[52] U.S. Cl. .......................................................... 395/705
[58] Field of Search ................................. 395/705, 710, 395/708, 500, 701

[56] References Cited

U.S. PATENT DOCUMENTS

| | | | |
|---|---|---|---|
| 5,313,614 | 5/1994 | Goettelmann et al. | 395/500 |
| 5,430,864 | 7/1995 | Powell et al. | 395/500 |
| 5,560,013 | 9/1996 | Scalzi et al. | 395/705 |
| 5,577,231 | 11/1996 | Scalzi et al. | 395/500 |
| 5,584,005 | 12/1996 | Miyaoku et al. | 395/416 |
| 5,598,560 | 1/1997 | Benson | 395/707 |
| 5,649,203 | 7/1997 | Sites | 395/709 |
| 5,805,896 | 11/1996 | Burgess | 395/710 |
| 5,809,306 | 1/1996 | Suzuki et al. | 395/705 |

OTHER PUBLICATIONS

Padovano, Michael, "Headaches of Porting To 64 Bits", *Unix Review*, (Jun., 1996), pp. 23–24.

Smith, Duane A., "Adding 64–bit Pointer Support to a 32–bit Run–time Library", *Digital Technical Journal*, vol. 8, No. 2, (1996), pp. 83–95.

Benson, Thomas R. et al., "The Open VMS Mixed Pointer Size Environment", *Digital Technical Journal*, Vo. 8, No. 2, (1996), pp. 72–83.

*Primary Examiner*—Eric W. Stamber
*Assistant Examiner*—Chameli Chaudhuri Das
*Attorney, Agent, or Firm*—Wood, Herron & Evans, L.L.P.

[57] ABSTRACT

A computer system, method of compiling, and method of accessing an address space utilize a data representation of a pointer that is smaller than the width of the address space during runtime of a computer program to retrieve a selected memory address in the address space whenever an access to the address space is required. For uses of the pointer that do not require an access to the address space, such as many arithmetic operations, the smaller data representation of the pointer is used. Compilation of a computer program including a reference to a pointer results in the generation of mapping code that generates a data representation of a pointer that is mapped to a selected memory address in the address space during execution of the computer program. Compilation also results in generation of retrieval code in the computer program that retrieves, for each use of the pointer that requires an access to the address space, the selected memory address during execution of the computer program using the data representation of the pointer.

46 Claims, 5 Drawing Sheets

COMPUTER SYSTEM, METHOD OF COMPILING AND METHOD OF ACCESSING ADDRESS SPACE WITH POINTER OF DIFFERENT WIDTH THEREFROM

FIELD OF THE INVENTION

The invention generally relates to compilers and methods of compiling computer programs for executing on computer systems and the like. In particular, the invention relates to the compilation and utilization of pointers in computer programs.

BACKGROUND OF THE INVENTION

Compilers are typically used to compile one computer program into another computer program—that is, to convert program instructions in one format in a computer program into another format in the other program. Put another way, compilers may also be considered to compile a computer program from one representation of the computer program to another representation of the computer program, where the different representations are themselves other computer programs, but are intended to perform basically the same computer operations.

Typically, a computer program is first written in a human-readable format, known as source code. Program instructions in the computer program are presented in the form of alphanumeric statements, and may include text labels that a programmer uses to identify variables and functions, as well as comments that the programmer includes to explain how the program works. The source code representation is then passed through a compiler to generate a machine-readable computer program, often known as object code, that can be directly executed by the computer system.

One principal advantage of compilers is that they often enable computer programs to be written in a single source code representation, and then compiled into different object code computer programs that can be executed on different computer systems. Computer systems are also referred to as platforms, and it is common to refer to a computer program that is able to execute on a particular computer system as being "native" to that platform.

It is often desirable to be able to recompile, or "port", a computer program originally written for execution on one platform to create a new computer program capable of being executed on another platform. Often, substantial development efforts are saved since a programmer does not have to start from scratch when adapting a computer program for execution on the new platform.

Computer programs may be ported to other manufacturers' platforms; however, an often more desirable task is to port computer programs written for one manufacturer's platform for execution on new platforms from the same manufacturer. In particular, it should be appreciated that a substantial amount of computer software may have been developed for a given platform, and it is often desirable to be able to adapt such software for use on later platforms.

From the user perspective, the most desirable alternative is to maintain backward compatibility in later platforms such that object code computer programs from an earlier platform may be executed on later platforms without any modification. However, this may not be possible in some instances due to underlying hardware or operating system changes on the later platforms.

For example, one change that may substantially hamper the ability of a native computer program for an earlier platform to execute on a later platform is a change in address space, e.g., a change from 32-bit addressing to 64-bit addressing. In particular, any computer system typically includes memory storage with an address space representative of a number of storage locations accessed by unique identifiers known as memory addresses. By referring to the memory address for a storage location, a computer system is able to write information into the storage location or read information from the storage location.

The number of storage locations, and thus, the size of the memory storage, is limited by the number of unique memory addresses available in a particular addressing space. For example, in 32-bit addressing, 32 binary bits are used to identify a particular storage location, indicating that the address space has a "width" of 32 bits. As a result, a maximum of $2^{32}$ unique combinations are possible, thereby providing a maximum of a little over 4 trillion unique storage locations. In many computer systems, storage locations are typically considered to hold eight binary bits, or one byte, of information each, and thus, 32-bit addressing provides a 4-gigabyte (GB) address space.

As the complexity and power of computer systems continue to increase, greater address spaces are required—particularly in networked environments where multiple users often share a common address space. Consequently, many platforms are now being designed to operate with 64-bit addressing, where a maximum of $2^{64}$ combinations of bits, and thus, over 18,000,000,000,000,000,000 unique storage locations are permitted.

A compiler typically requires information processed in a computer program to be classified into a particular data type, as some types of information may need to be handled differently than others. For example, strings of alphanumeric characters are typically stored and processed differently than numbers.

One commonly-used data type in many computer programs is a pointer, which is essentially a memory address that "points" to a particular storage location in memory. Pointers are principally used to dynamically allocate memory during execution of a computer program so that the amount of memory used by a computer program can vary with the needs of the program. Upon initialization of a pointer, the pointer is typically assigned to the memory address of a free storage location. This enables a computer program to use storage locations without concern for the particular addresses of those locations.

One characteristic of many computer platforms is that pointers are often the same width (i.e., they have the same number of bits) as the basic numeric data type, the integer. This is often due to the fact that optimal performance occurs when both data types occupy the full width of various information buses for the platform. Moreover, since both data types occupy the same width, the data types are often considered to be the same data type for certain operations. For example, many pointer arithmetic operations such as incrementing, decrementing, assignment, etc., are often treated as integer operations by both programmers and compilers alike.

The relationship between pointer and integer data types was maintained from the days of 8-bit and 16-bit addressing, and continued through to 32-bit addressing. However, in the following generation of computer platforms having 64-bit addressing, this relationship does not always hold true. In particular, the integer data type in many such systems is maintained at 32 bits in width, while the pointer data type is expanded to 64 bits in width.

As a result of previous reliance on the compatibility between pointer and integer data types, many computer programs native to 32-bit platforms are not easily ported to 64-bit platforms since many of the arithmetic operations performed on pointers on the 32-bit computer programs are no longer permitted on 64-bit platforms. Often, significant development efforts, and specifically, manual modifications to the earlier programs, are required.

Consequently, a significant need exists for a manner of facilitating the porting of computer programs written for specific platforms to permit execution of such programs on other platforms.

SUMMARY OF THE INVENTION

The invention addresses these and other problems associated with the prior art in providing a computer system, method of compiling, and method of accessing an address space in which a data representation of a pointer that is smaller than the width of the address space is selectively used during runtime of a computer program to retrieve a selected memory address in the address space whenever an access to the address space is required. Typically, for uses of the pointer that do not require an access to the address space, such as many arithmetic operations, the smaller data representation of the pointer is used.

Compilation of a computer program including a reference to a pointer results in the generation of mapping code that generates a data representation of a pointer that is mapped to a selected memory address in the address space during execution of the computer program. Compilation also results in generation of retrieval code in the computer program that retrieves, for each use of the pointer that requires an access to the address space, the selected memory address during execution of the computer program using the data representation of the pointer.

While the invention is not specifically limited to porting computer programs to other platforms, one advantage is that computer programs written for prior platforms may often be ported to later platforms with significantly less development effort. For example, in one embodiment of the invention, a computer program written for a 32-bit address space that relies on the interchangeability of pointers and integers may be recompiled to execute in a 64-bit address space that has separate widths for pointers and integers. Pointers may be maintained in 32-bit data representations that are directly compatible with many uses of the pointers in the computer program, e.g., arithmetic pointer operations. For those uses that are not directly compatible, e.g., accesses to the address space, retrieval code may be generated in the computer program to retrieve the selected memory address referenced by the pointer during execution of the computer program.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
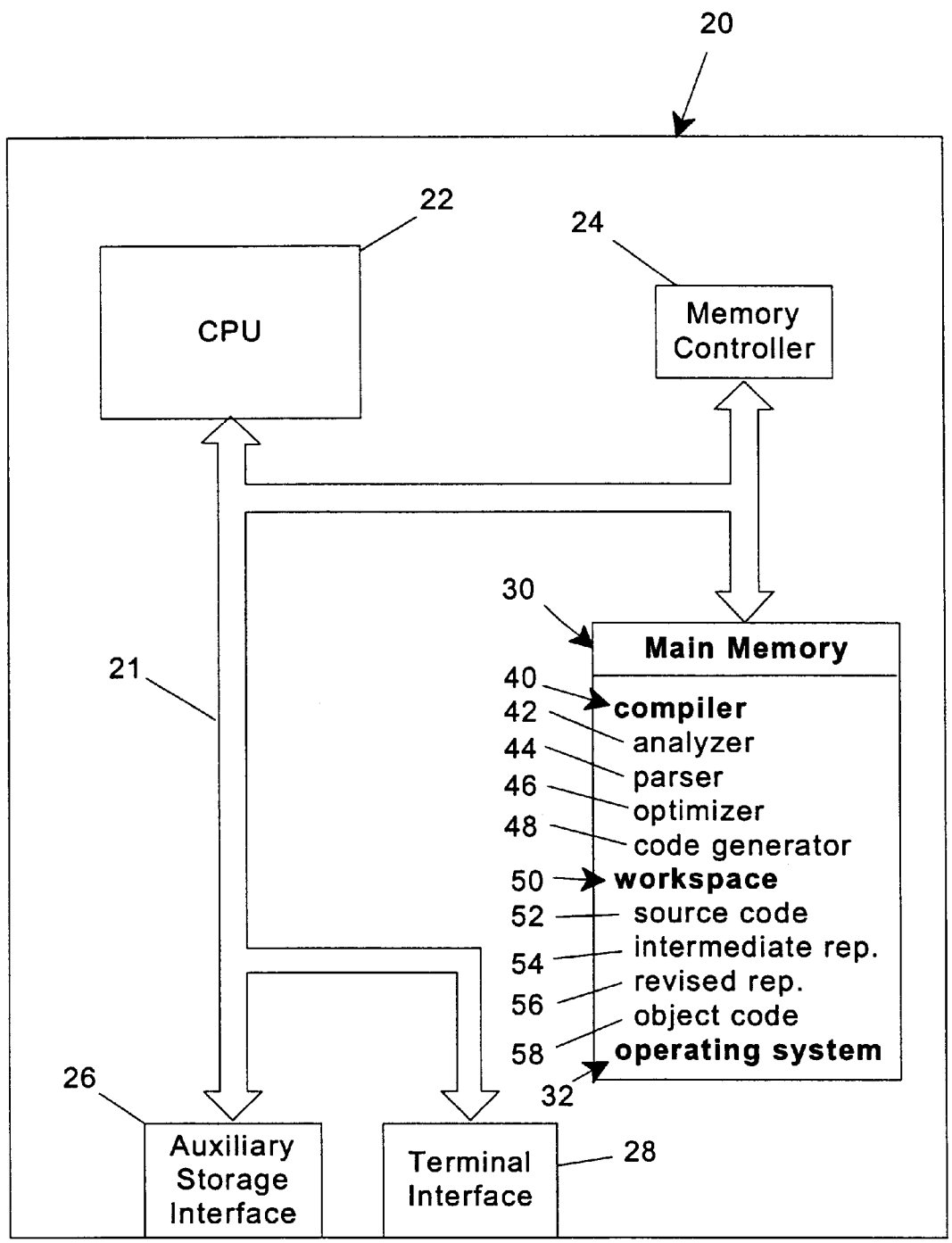
FIG. 1 is a block diagram of a computer system consistent with the invention.

Prior to discussing the operation of the various embodiments of the invention, a brief overview discussion of compilers and compiling techniques is provided herein.

Overview of Compilers

Compilers and the like are generally known in the art. See, for example, Alfred V. Aho, Ravi Sethi, and Jeffrey D. Ullman, *Compilers: Principles, Techniques, and Tools,* Addison-Wesley, 1986, which is incorporated by reference herein.

One known type of compiler is a multi-pass optimizing compiler, which includes a front-end module for converting source code into an intermediate representation, and a back-end module that takes the intermediate representation and generates object code therefrom.

The front-end module of a multi-pass optimizing compiler typically includes a lexicographic analyzer that identifies tokens or key words in the source code, and a parser that analyzes the program statement by statement. The parser typically uses a context-free grammar to determine if program statements satisfy a set of grammar rules, and builds constructs therefrom. The parser then generates an intermediate representation using an intermediate code generator.

The back-end module of a multi-pass optimizing compiler typically includes an optimizer or optimizing module that operates on the intermediate representation to generate a revised or optimized intermediate representation. Several different optimizations may be performed, including but not limited to local optimization such as value numbering, elimination of redundant computations, register allocation and assignment, instruction scheduling to match specific machine characteristics, invariant code motion out of loops, strength reduction, induction variable elimination, and copy propagation, among others. The back-end module also includes a final code generator to generate the object code from the revised intermediate representation.

A compiler may reside within the memory of the computer system upon which the object code generated by the compiler is executed. Alternatively, a compiler may be a cross-compiler that resides on one computer system to generate object code for execution on another computer system. Either type of compiler may be used consistent with the invention.

One suitable back-end module for use with the invention is an AS/400 optimizing translator supplied with an AS/400 minicomputer, which is a common back-end module of an optimizing compiler. This product may be used with a front-end module such as the ILE C Compiler available from International Business Machines Corporation, among others. The discussion and examples below are specifically directed to the C programming language and its derivatives, in particular C++. It will be appreciated, however, that other compilers, which are suitable for different languages and/or different hardware platforms, may also be used in the alternative, and thus, the invention should not be limited to the specific implementations discussed herein.

Exemplary Hardware Embodiments

Turning to the Drawing, wherein like numbers denote like parts throughout the several views, FIG. 1 shows a block diagram of a computer system 20 consistent with the invention. Computer system 20 may be, for example, an IBM AS/400 minicomputer. However, those skilled in the art will appreciate that the various embodiments of the invention may be utilized in practically any computer system, regardless of whether the computer system is a complex multi-user networked computer system or a single user system such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 28.

Auxiliary storage interface 26 allows computer system 100 to store and retrieve information from auxiliary storage such as magnetic disk, magnetic tape or optical storage devices. Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Terminal interface 28 allows system administrators and computer programmers to communicate with computer system 20, normally through programmable workstations. Although the system depicted in FIG. 1 contains only a single main CPU and a single system bus, it should be understood that the invention also applies to computer systems having multiple CPU's and buses.

Main memory 30 is shown storing a compiler 40 (comprising analyzer 42, parser 44, optimizer 46 and code generator 48) and operating system 32. Memory 30 also includes a workspace 50 that is shown storing a computer program in various stages of compilation, including a source code representation 52, an intermediate representation 54, an optimized representation 56 and an object code 58. However, it should be understood that main memory 30 will not necessarily always contain all parts of all mechanisms shown. For example, portions of compiler 40 and operating system 32 will typically be loaded into caches in CPU 22 to execute, while other files may well be stored on magnetic or optical disk storage devices. Moreover, the various representations 52–58 of a computer program may not be resident in the main memory at the same time. Various representations may also be created by modifying a prior representation in situ. In addition, as discussed above, the front-end and back-end modules in some systems may be separate programs.

It will be appreciated that computer system 20 is merely an example of one system upon which routines consistent with the invention may execute. Further, as innumerable alternative system designs may be used, the invention should not be limited to any particular configuration shown herein.

It should also be appreciated that, the routines executed to implement the illustrated embodiments of the invention, whether implemented as part of an operating system or a specific application, program, object, module or sequence of instructions may be referred to generally as "computer programs". The computer programs typically comprise instructions that, when read and executed by one or more processors in the devices or systems in a computer system consistent with the invention, cause those devices or systems to perform the steps necessary to execute steps or elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Exemplary Software Embodiment

Consistent with the invention, a pointer to a selected memory address in an address space may be maintained in a first data representation and mapped to a second data representation whenever access to the address space is required. In the specific embodiments discussed in greater detail below, the first data representation of a pointer is a 32-bit pointer data type, and the second data representation is a 16-byte (or 128-bit) pointer data type that is used to access a 64-bit wide address space. It should be appreciated, however, that a pointer may be maintained in and mapped between innumerable other data representations consistent with the invention, and thus, the invention should not be limited to the particular implementations discussed herein.

The 32-bit pointer data type in the embodiments discussed below is interchangeable with the basic integer data type used in the computer system, and thus, a number of integer operations may be performed directly on a 32-bit pointer. For example, arithmetic operations such as incrementing and decrementing pointers (whether by one or by a specified amount) may be performed on 32-bit pointers. Moreover, assignment operations such as setting a pointer to the value of a constant, an integer, or another 32-bit pointer (with or without increments or decrements) may also be performed. Furthermore, 32-bit pointers may be passed as integer parameters in a number of function calls. It should be appreciated, however, that interchangeability with integer or other data types is not required in other embodiments of the invention.

The 16-byte pointer data type includes 64 bits of addressing information, and 64 bits of authority information. The addressing information refers to a 64-bit memory address referenced by the pointer. The authority information is utilized by an operating system to provide capability-based addressing. This type of capability-based memory architecture is utilized, for example, in the AS/400 midrange computer system, and the use and implementation thereof is well known in the art. It should be appreciated, however, that no authority information may be provided in the second data representation, e.g., by using a 64-bit pointer data type with 64 bits of addressing information.

Figure 2:
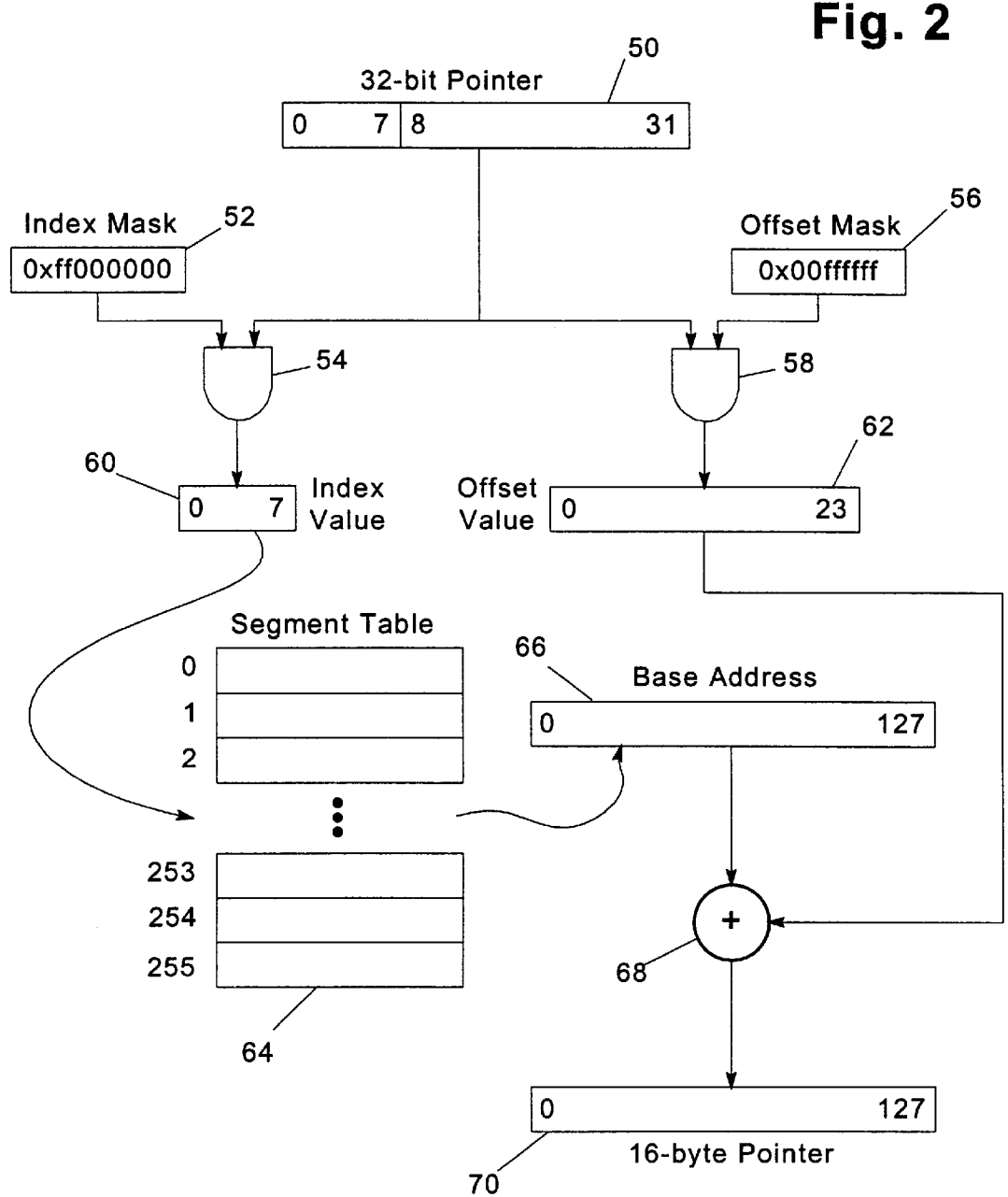
FIG. 2 is a block diagram illustrating retrieval of a 16-byte pointer from a 32-bit pointer consistent with the invention.

A pointer may be mapped from one data representation to another data representation in a number of manners. For example, as shown in FIG. 2, a 32-bit pointer data representation 50 may be mapped to a 16-byte pointer data representation 70 using a segment table 64 in a similar manner to conventional virtual addressing memory systems utilized in a number of operating systems. 32-bit pointer 50 may be partitioned into index and offset portions from which may be derived index and offset values 60, 62. For example, the eight most significant bits (MSB's) of pointer 50, bits 0–7, may be stripped from pointer 50 via a logical-AND operation with an index mask 52 (0xff000000) to generate index value 60, as illustrated by AND gate 54. Similarly, the 24 least significant bits (LSB's) of pointer 50, bits 8–31, may be stripped from pointer 50 via a logical-AND operation with an offset mask 56 (0x00ffffff) to generate offset value 62, as illustrated by AND gate 58.

Index value 60 may be used as an index into segment table 64. With an 8-bit index value, 256 table entries may be accessed. Each table entry, e.g., table entry 66, includes a 16-byte base address for a segment of memory in the address space. This base address may be summed, e.g., as shown at 68, with offset value 62 to generate 16-byte pointer 70.

Any number of segment tables may also be utilized consistent with the invention. For example, a single segment table may be used by an entire computer system, or multiple segment tables, e.g., dedicated to different users, different processes, different procedures, different named activation groups, etc., whether maintained persistently, globally or locally, may also be used.

It should be appreciated that different bits and numbers of bits from a 32-bit representation of a pointer may be used as index and offset values, depending, for example, upon the size of a segment and/or on the number of entries desired in the segment table. However, when used in a system such as the AS/400 minicomputer that allocates memory in 16 MB memory segments, it has been found that a 24-bit offset value permits access to any memory address in a given segment, and thus full addressing within any segment referenced in the segment table is assured.

It should also be appreciated that the bits from the pointer may not necessarily be directly mapped to the index and/or offset values. For example, a hashing algorithm or a truncation algorithm may be used to generate the index value to the table and/or the offset value.

It should further be appreciated that other manners of mapping a data representation of a pointer to a larger address space may also be used in the alternative. For example, a pointer may simply include an offset value that is truncated with zeros and/or concatenated with a base address, e.g., the base address of the system heap. However, it has been found that the use of a segment table provides the advantage that a pointer can reference any 16 MB segment of memory in the address space, rather than being confined to any particular segment in the address space.

As discussed above, pointers are typically maintained in 32-bit representations, with 16-byte representations thereof retrieved whenever an access to the address space is required. Consistent with the invention, handling of the pointer representations in a computer program during runtime is handled by program code that is automatically generated and inserted into the computer program during compilation.

At the outset, it should be appreciated that any reference to a pointer in a source code representation of a computer program may be considered to be a 32-bit pointer or a 16-byte pointer, thereby necessitating a manner of distinguishing the two representations in a compiler. For example, a compiler may assume that all pointer references (e.g., declarations, uses, initializations, etc.) are to 32-bit pointer representations, and thus operate on all pointers in the manner described herein. In addition, a flag or command line switch may be utilized to command a compiler to operate in this manner. Moreover, whenever 16-byte representations are required, they may be defined using a specific data type.

In the alternative, 32-bit pointers may be separately declared with specific data types, with all other pointers either declared as or defaulted to 16-byte representations. Moreover, a compiler directive, e.g. "#pragma" may be utilized to indicate to the compiler that all pointers within a given section are to be defined in 32-bit representations. Other manners of indicating which pointers to handle in 32-bit representations may be used in the alternative.

One form of automatically generated program code is retrieval code that performs the retrieval of a 16-byte representation from a 32-bit representation. Another form of automatically generated program code is mapping code used to create a 32-bit representation of a pointer that is mapped to a memory address in the 64-bit wide address space. The mapping code is generated whenever the pointer is initialized—that is, when the pointer is initially created either as a result of a memory allocation operation or assignment of a new pointer variable to an existing data object. Yet another form of automatically generated program code is memory allocation code that allocates a new pointer and returns a 32-bit representation thereof.

The generation of program code consistent with the invention may be performed at various stages in the compilation of a computer program. As will become more apparent below, it is preferable to generate the program code prior to optimization, e.g., in the front-end module of a compiler, due to the performance gains that can result from conventional optimization. However it should be appreciated that the generation of program code may be performed at other stages of compilation in the alternative. For example, automatic code generation may be performed by parser 44 of FIG. 1 in conjunction with parsing and scanning a source code representation of a computer program and forming an intermediate program code representation therefrom.

Figure 3:
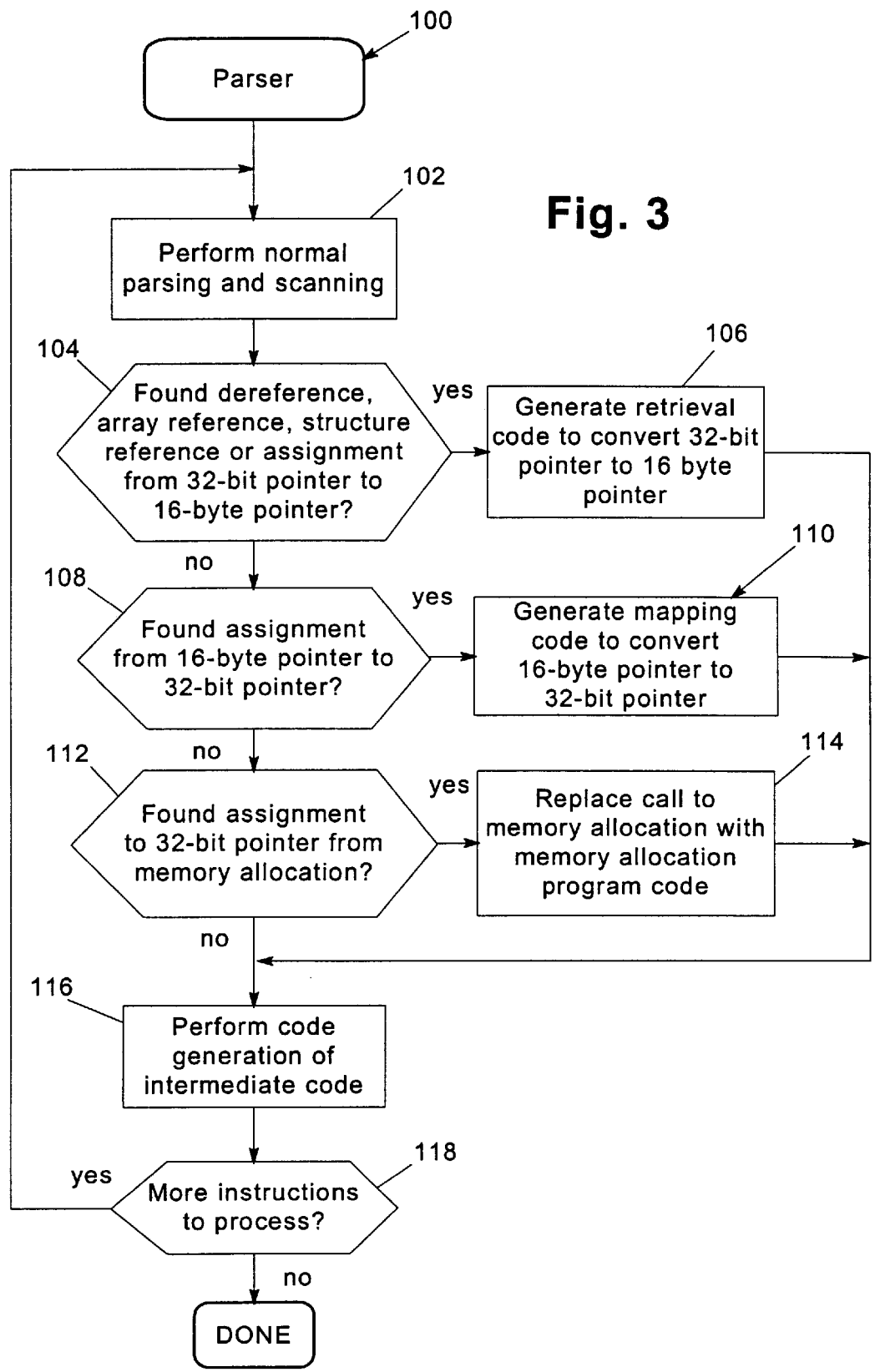
FIG. 3 is a flowchart illustrating the program flow of a parser routine consistent with the invention.

As shown in FIG. 3, for example, a routine 100 that executes for parser 44 of FIG. 1 may perform conventional parsing and scanning operations on each instruction in a computer program beginning in block 102. These conventional operations are well known in the art and not relevant to an understanding of the invention, and therefore are not discussed in greater detail herein.

Block 104 next determines whether a given instruction requires an access by a 32-bit pointer (e.g., "ptr_32") to the address space. Typically, such accesses are required in C programs in several instances: pointer dereferences (e.g., "*ptr_32"), pointer array references (e.g., "ptr_32[]"), pointer structure member references (e.g., "ptr_32→"), assignments of 32-bit pointers to 16-byte pointers (e.g., "ptr_16:=ptr32", where ptr_16 is a 16-byte pointer), and passing 32-bit pointers as parameters to function or procedure calls that expect 16-byte pointer parameters (e.g., "get_next_element(ptr_32)").

If an access to the address space is found, control passes to a code generator block 106 to generate retrieval code for retrieving a 16-byte representation of a pointer from a 32-bit representation thereof. For example, one suitable retrieval program code is the C statement:

segment_table[ptr_32 & 0xff000000]+(ptr_32 & 0x00ffffff), which basically follows the program flow illustrated in FIG. 2. The retrieval code typically may be inlined into the program code in place of any such reference to the 32-bit pointer ptr_32 in the source code that requires access to the address space. In the alternative, a call to a retrieval routine may be used. However, it has been found that the above-described program code is generally efficient enough to not warrant the additional overhead associated with a function call. Other manners of performing this retrieval operation may be used in the alternative.

Once the retrieval code is generated, control passes to block 116 to generate the intermediate code for the retrieval code. It should be appreciated, however, that the retrieval code may also be inlined directly into an intermediate code representation, rather than inlining a source code representation followed by generation of the intermediate code representation therefrom.

Next, as long as additional unparsed instructions exist in the source code, block 118 returns control to block 102 to process such instructions. Once all instructions in the source code have been processed, parsing and intermediate code generation is complete.

Returning to block 104, if the current instruction does not access the address space, control passes to block 108 to determine whether an assignment from a 16-byte pointer to a 32-bit pointer has occurred. If so, control passes to a code generator block 110 to generate mapping code to convert the 16-byte pointer to a 32-bit pointer, prior to passing control to block 116.

Assignment of a 16-byte pointer to a 32-bit pointer in the mapping code is essentially the reverse operation of the retrieval code, albeit generally with additional overhead compared thereto. Accordingly, generally a single mapping routine is typically utilized to map a 16-byte pointer to a 32-bit pointer, with the mapping program code including a suitable function call to the routine inlined into the source code at the appropriate location. In the alternative, the mapping program code may simply have the mapping routine inlined into the source code.

Figure 4:
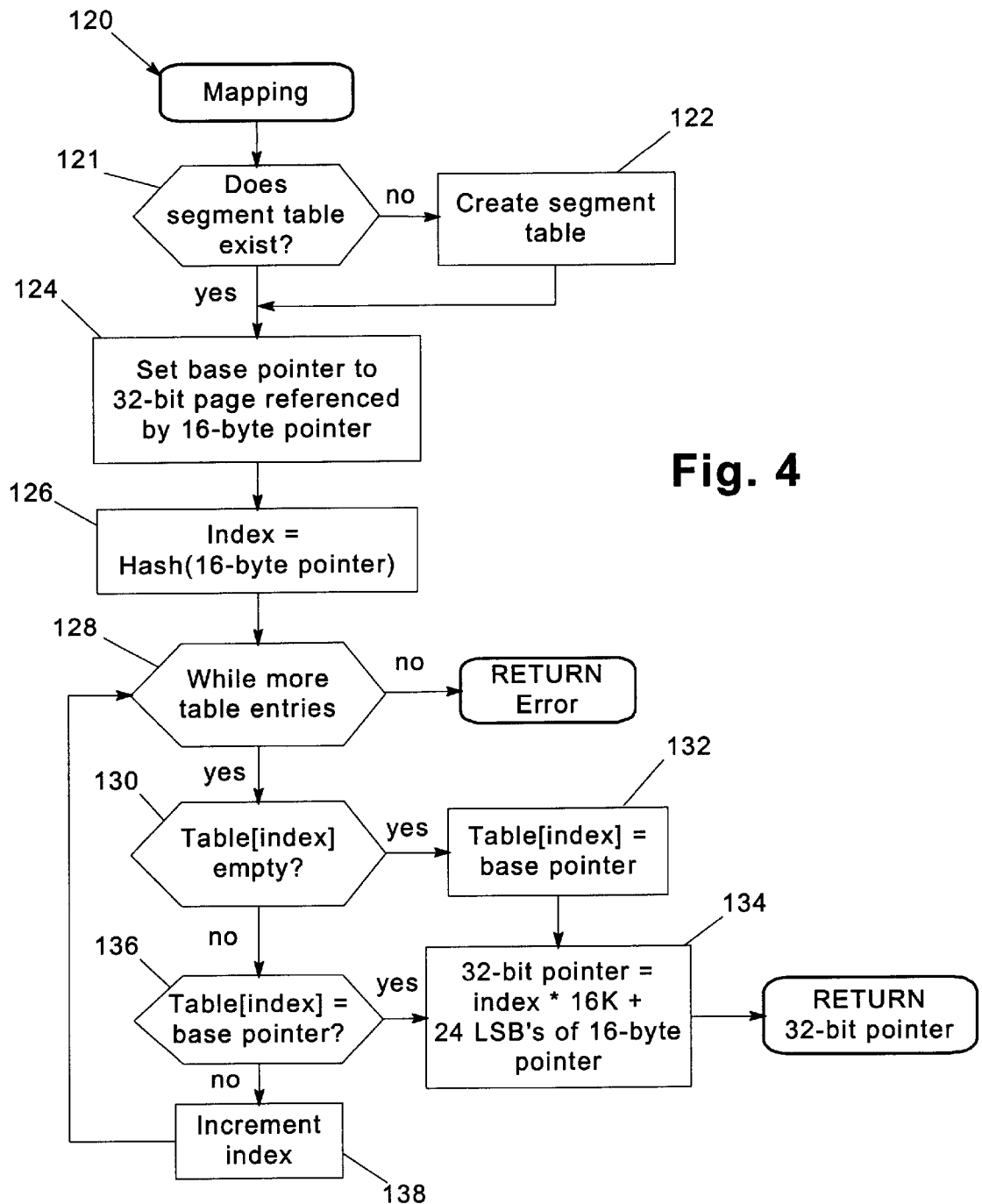
FIG. 4 is a flowchart illustrating the program flow of a mapping routine consistent with the invention.

For example, FIG. 4 illustrates the program flow of one suitable mapping routine 120 consistent with the invention, which is passed as a parameter a 16-byte pointer, and which returns a 32-bit pointer that has been mapped to the 16-byte pointer. First, in block 121, it is determined whether a segment table exists, and if not, a segment table is created in block 122 by allocating memory space for a 256×16 byte table. As discussed above, any number of segment tables may be utilized, e.g., for different users, processes, procedures, etc.

Next, in block 124, a base pointer variable is set to the base address of the 16 MB (24-bit wide) memory segment in the address space that is pointed to by the 16-byte pointer. This may be performed, for example, by type casting the pointer to an integer and subtracting the integer type cast from the 16-byte memory address referenced in the pointer.

Next, in block 126, an index into the segment table is generated using a hashing algorithm. For example, an index may be generated using the eleventh or other byte in the 16-byte pointer, or other known hashing algorithms. In the alternative, the table may be searched from the first entry every time.

Next, in block 128, a while loop is initiated to test each entry in the segment table starting with that referred to by the index variable. Next, block 130 determines whether the segment table entry referenced by the index variable is empty (e.g., set to zero). If so, control passes to block 132 to store the base pointer in the segment table entry referenced by the index variable. Next, in block 134, a 32-bit pointer is generated by concatenating the index variable (i.e., by multiplying the index by 16K to shift the index left 24 bits) with the 24 LSB's of the 16-byte pointer. Next, the 32-bit pointer is returned and the mapping code routine terminates.

Returning to block 130, if the segment table entry referenced by the index variable is not empty, control is passed to block 136 to determine if this segment table entry points to the base address of the same segment as the base pointer.

If so, control passes to block 134 to generate and return the 32-bit pointer as discussed above.

If not, control passes to block 138 to increment the index variable (including, if necessary, rolling the index variable to the start of the segment table). Control is then passed to block 128 to analyze the next entry in the segment table, until either an empty entry or an entry matching the base pointer is found. If neither type of entry is found, an error is returned from block 128, as no additional segments may be added to the table. In the alternative, additional processing may be provided to swap out unused segment table entries or create a new segment table if desired.

Returning to block 108 of FIG. 3, if no assignment from a 16-byte pointer to a 32-bit pointer is found, control passes to block 112 to determine whether a memory allocation to a 32-bit pointer has occurred, typically either as a result of a new operator or a malloc( ), calloc( ), realloc( ), or similar function call. If so, control passes to block 114 to replace the call to the memory allocation function with alternate memory allocation program code, prior to passing control to block 116. As with the mapping code, generally a single alternate memory allocation routine for each type of memory allocation is typically utilized, with a suitable call to the routine inlined into the source code at the appropriate location. In the alternative, the memory allocation program code can simply have the alternate memory allocation routine inlined into the source code.

Figure 5:
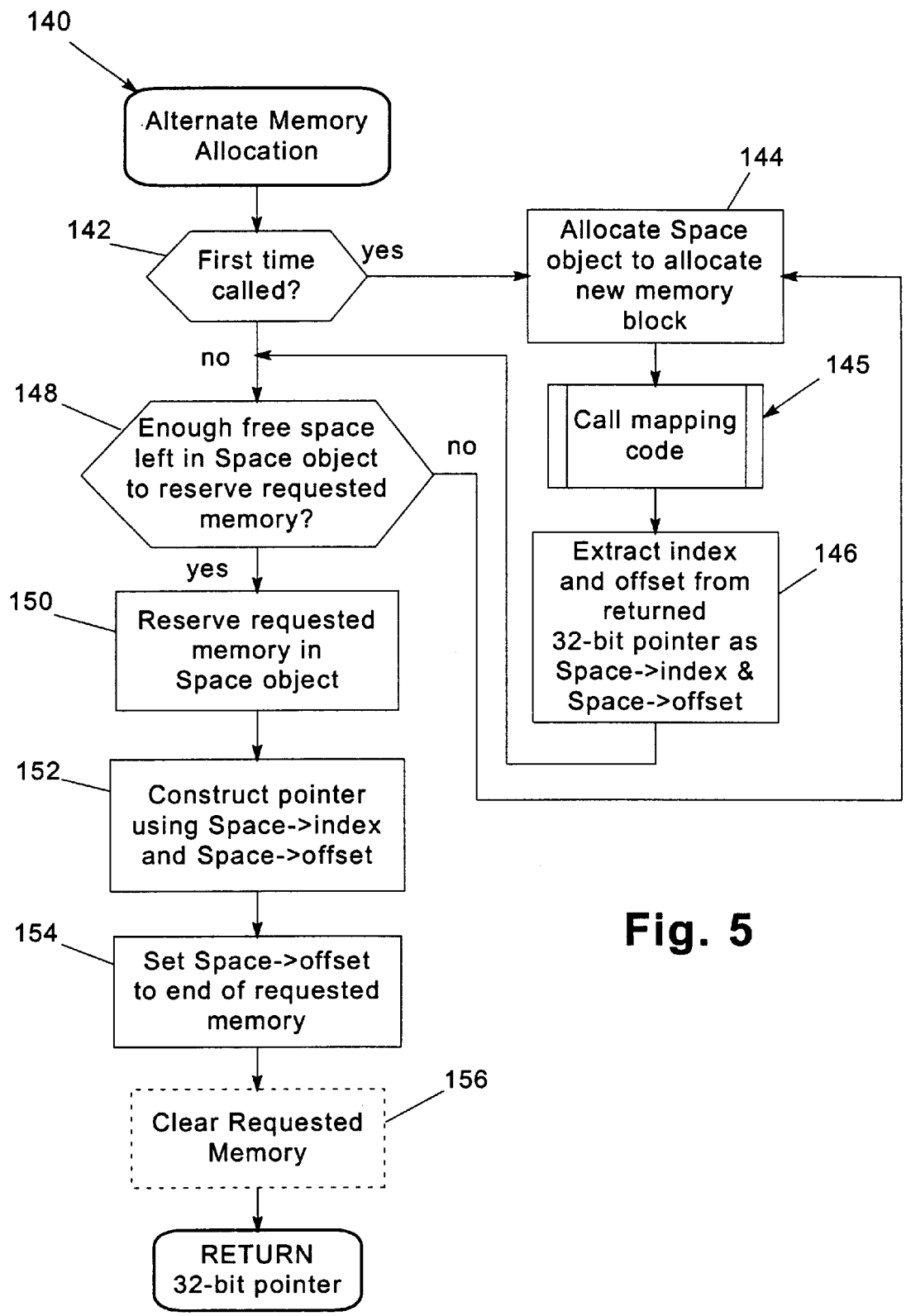
FIG. 5 is a flowchart illustrating the program flow of a memory allocation routine consistent with the invention.

As shown in FIG. 5, one suitable alternate memory allocation routine 140 suitable for replacing a malloc ( ) or calloc ( ) call begins at block 142 by determining whether this call is the first memory allocation request. If not, control passes to block 148 (discussed below). If so, however, control is passed to block 144 to allocate a Space object, which results in allocation of a 16 MB segment of the address space. Allocation of the Space object is typically performed by calling a conventional memory allocation routine (e.g., malloc( ) or calloc( )) that allocates 16 MB of memory for the Space object and returns a 16-byte pointer that points to the beginning thereof.

It has been found to improve performance if full segments of the address space are allocated and used for filling allocation requests for particular sizes of the address space. Specifically, as will become apparent below, when fall segments of the address space are allocated at a time, the relatively expensive conversion of 16-byte pointers to 32-bit pointers needs to be performed only when the segments are allocated, rather than each and every time memory is allocated. When a segment is allocated, the base address for the segment is typically stored in the segment table such that a segment index therefor points to the base address of the segment. Subsequent allocation requests that are reserved in an allocated segment may then utilize the segment index to generate the 32-bit pointers therefor. In the alternative, however, memory may be allocated specifically on an as-needed basis.

Next, in block 145, a mapping routine such as mapping routine 120 of FIG. 4 is called to map the 16-byte base address of the newly allocated memory segment to a 32-bit pointer and thereby store the base address thereof in the segment table. Next, in block 146, the index and offset values from the returned 32-bit pointer are extracted and stored in index and offset fields of the Space object. Consequently, the Space object includes a segment index pointing to the segment table entry for the memory segment.

Control is then passed to block 148 to determine whether enough free space is left in the Space object to reserve the amount of requested memory specified in the parameters passed to the routine. If not, control is passed back to block 144 to request allocation of an additional segment of memory. If so, control passes to block 150 to reserve the requested memory in the Space object. Next, the 32-bit pointer is constructed in block 152 using the segment index and the current offset value stored in the Space object. The offset value stored in the Space object is then set in block 154 to the next free memory address at the end of the requested memory. Next, as illustrated in optional block 156, if the memory allocation routine requires the allocated memory to be cleared (e.g., as in a calloc( ) routine), the requested memory is cleared in a manner known in the art. The 32-bit pointer generated in block 152 may then be returned and the routine terminated.

Returning to block 112 of FIG. 3, if no assignment to a 32-bit pointer from a memory allocation routine is found, control passes to block 116 to perform intermediate code generation. The remaining instructions in the source code are then processed sequentially in the manner described below, resulting in an intermediate code representation.

Upon generation of the intermediate code, suitable optimization and object code generation is performed by an optimizing back-end module of a compiler, resulting in an object code representation of the computer program in a manner well known in the art. One advantage of performing the automatic code generation prior to optimization is that some redundant code, specifically much of the retrieval code, may be eliminated. The following working example set forth below illustrates this advantage in greater detail. However, it should be appreciated that no optimization may be performed in the alternative.

Working Example

Table I below illustrates an exemplary source code representation in C:

TABLE I

Source Code Representation

```
1   int i;
2
3   build_list (LIST * (*in), LIST 16_Byte *Tail)
4   {
5       LIST *ptr;
6
7       i = 0;
8
9       while(i < 100)
10      {
11          ptr = malloc ( sizeof(LIST));
12
13          if (i==0) ptr->next = Tail;
14              else ptr->next = (*in);
15          ptr->data = i;
16          (*in) = ptr
17          i++;
18      }
19  }
```

A build_list( ) routine receives as input an in pointer that points to a LIST structure having last and next pointers and a data integer, and a Tail pointer that is specifically defined as a 16-byte pointer to a List structure. A ptr pointer local to the build_list( ) routine is also defined as a pointer to the List structure. Assuming that all pointers with the exception of Tail may be defined as 32-bit pointers, and that 32-bit pointers are interchangeable with integers, after passing the exemplary source code representation through parser 44, the following conceptual program code would be generated (albeit in an intermediate code representation):

TABLE II

Parsed Conceptual Representation

```
1   int i;
2
3   build_list (int in, LIST 16_Byte *Tail)
4   {
5       int ptr;
6
7       i = 0;
8
9       while(i < 100)
10      {
11          ptr = malloc32 (sizeof(LIST));
12
13          if (i==0) (LIST * (segment_table[ptr &
                    0xff000000] + (ptr & 0x00ffffff))->
                    next = map_16_32(Tail);
14              else (LIST * (segment_table[ptr &
                    0xff000000] + (ptr & 0x00ffffff))->
                    next = *(LIST * (segment_table[in &
                    0xff000000] + (in & 0x00ffffff));
15          (LIST * (segment_table[ptr &
                    0xff000000] + (ptr & 0x00ffffff))->
                    data = i;
16          in = ptr;
17          i++;
18      }
19  }
```

It should be appreciated from Table II that the pointers with the exception of Tail in this example have been defined as 32-bit integers. Moreover, memory allocation program code is generated at line 11 to call an alternate memory allocation routine (malloc32( )) that operates in the general manner illustrated in FIG. 5 to allocate memory for ptr. Retrieval code has been generated for each use of a 32-bit pointer that accesses the address space, e.g., at lines 13–15. Mapping code has also been generated at line 13 to call a mapping routine map_16_32( ) to convert the 16-byte pointer Tail into a 32-bit pointer for storage inptr→next, in the general manner illustrated in FIG. 4. Otherwise, additional uses of the pointers, e.g., the assignment of in to ptr at line 16, are performed as integer operations without additional overhead.

As discussed above, optimization of the intermediate program code may result in the elimination of redundant code, specifically retrieval code, as illustrated by the following optimized conceptual program code:

TABLE III

Optimized Conceptual Representation

```
1   int i;
2
3   build_list (int in, LIST 16_Byte *Tail)
4   {
5       int ptr;
6       LIST *temp;
7       i = 0;
8
9       while (i < 100)
10      {
11          ptr = malloc32 ( sizeof(LIST));
12          temp = (segment_table[ptr & 0xff000000] +
                    ptr & 0x00ffffff))
13          if (i==0) temp->next = map_16_32(Tail);
14              else temp->next = *(LIST * (segment_table
                    [in & 0xff000000] + (in & 0x00ffffff));
15          temp->data = i;
```

TABLE III-continued

Optimized Conceptual Representation

```
16          in = ptr;
17          i++;
18      }
19  }
```

As shown in Table III, the multiple retrieval codes that access the memory address for pointer ptr may be preceded with a single retrieval code at line 12 that returns a 16-byte pointer to a temp pointer defined at line 6. Then, as shown in lines 13–15, each access use for ptr may be replaced with the 16-byte address in temp, thereby eliminating one of the two retrieval codes for ptr that would be executed irrespective of the result of the if statement on line 13.

Conclusion

The use of 32-bit pointers in a 64-bit wide address space provides a number of significant advantages for many applications. For example, many pointer arithmetic operations may be performed more quickly and efficiently as integer operations. In addition, a lower overhead may be associated with generating a 16-byte pointer from a 32-bit pointer compared to generating a 32-bit pointer from a 16-byte pointer. Moreover, memory space and performance may be improved since 32-bit pointers take up ¼ the space of 16-byte pointers and do not have 16-byte alignment requirements—thus often increasing cache hits. Other advantages will be apparent to one of ordinary skill in the art.

Various modifications may be made to the various embodiments without departing from the spirit and scope of the invention. Therefore, the invention lies solely in the claims hereinafter appended.

What is claimed is:

1. A method of compiling a first computer program into a second computer program, the first computer program including a reference to a pointer, and the second computer program configured to execute on a computer system including an address space including a plurality of memory addresses, each having a predetermined width, the method comprising:

(a) generating mapping program code configured to generate a data representation of the pointer that is mapped to a selected memory address in the address space upon initialization of the pointer during execution of the second computer program, the data representation of the pointer having a predetermined width that is smaller than the predetermined width of the selected memory address; and (b) for each use of the pointer that requires an access to the address space, generating retrieval program code configured to retrieve the selected memory address using the data representation of the pointer during execution of the second computer programs wherein each use of the pointer that requires an access to the address space is selected from the group consisting of a pointer dereference, a pointer array reference, a pointer structure member reference, an assignment of a second pointer in a second data representation, a parameter in a function call, and combinations thereof.

2. The method of claim 1, wherein the first computer program is in a source code language, and the second computer program is in a machine-readable language.

3. The method of claim 1, wherein the predetermined width of the data representation is 32 bits, and wherein the predetermined width of the selected memory address is 64 bits.

4. The method of claim 1, wherein the data representation of the pointer is a first data representation, and wherein the mapping program code is configured to map the first data representation to a second data representation associated with the selected memory address, wherein the predetermined width of the first data representation is 32 bits, and wherein the predetermined width of the second data representation is 128 bits, the second data representation including 64 bits of addressing information and 64 bits of authority information.

5. The method of claim 1, wherein the retrieval program code is configured to access a segment table including a plurality of segment table entries, each segment table entry including a base memory address pointing to one of a plurality of segments in the address space, and wherein the mapping program code is configured to store in the data representation of the pointer an index value associated with a selected one of the segment table entries, and an offset value associated with an offset from the base memory address stored in the selected segment table entry.

6. The method of claim 5, wherein the mapping program code is further configured to insert into the segment table a segment table entry with the base memory address of the segment in the address space for the selected memory address.

7. The method of claim 6, wherein each segment in the address space is 16 MB wide, wherein the segment table includes 256 64-bit wide segment table entries, and wherein the data representation of the pointer has a predetermined width of 32 bits including an 8-bit index value and a 24-bit offset value.

8. The method of claim 6, further comprising generating memory allocation code configured to allocate memory from the address space for the pointer such that the selected memory address points to the allocated memory.

9. The method of claim 8, wherein the memory allocation code operates in response to a memory allocation request for a predetermined amount of memory in the address space, wherein the memory allocation code is configured to allocate full segments of memory as needed and to generate segment indexes therefor pointing to selected segment table entries in the segment table, and wherein the memory allocation code is further configured to reserve a free portion of an allocated full segment for the predetermined amount of memory and to determine an index value for the pointer using the segment index of the allocated full segment.

10. The method of claim 1, further comprising generating pointer arithmetic program code configured to perform an arithmetic operation on the data representation of the pointer during execution of the second computer program, the arithmetic operation selected from the group consisting of a pointer increment, a pointer decrement, and an assignment to a second pointer having the same data representation.

11. The method of claim 10, wherein the data representation is an integer data type; whereby the arithmetic operation is performed as an integer operation.

12. The method of claim 1, further comprising optimizing the retrieval program code to eliminate redundant retrievals of the selected memory address.

13. A method of accessing with a pointer an address space in a computer system including a plurality of memory addresses partitioned into a plurality of memory segments, each memory address having a predetermined width, the method comprising:

(a) upon initialization of the pointer, generating a data representation of the pointer that is mapped to a selected memory address in the address space, the data representation of the pointer having a predetermined width that is smaller than the predetermined width of the selected memory address, and the data representation including:

(1) an index value associated with a selected one of a plurality of segment table entries in a segment table, the selected table entry including a base address of the memory segment for the selected memory address; and (2) an offset value associated with an offset of the selected memory address from the base address stored in the selected table entry;

(b) for each use of the pointer that does not require an access to the address space, performing a predetermined operation on the data representation of the pointer; and (c) for each use of the pointer that requires an access to the address space, generating the selected memory address for the pointer using the data representation thereof, including retrieving the base address from the segment table entry indexed by the index value of the data representation, and adding to the base address the offset value from the data representation, wherein each use of the pointer that requires an access to the address space is selected from the group consisting of a pointer dereference, a pointer array reference, a pointer structure member reference, an assignment of a second pointer in a second data representation, a parameter in a function call, and combinations thereof.

14. The method of claim 13, wherein the data representation is an integer data type; whereby the predetermined operation is performed as an integer operation.

15. The method of claim 13, wherein the predetermined operation is selected from the group consisting of a pointer increment, a pointer decrement, and an assignment to a second pointer having the same data representation.

16. The method of claim 13, further comprising allocating a predetermined amount of memory for the pointer upon initialization of the pointer, including:

(a) allocating a fall segment of memory in the address space, including determining a segment index for the fill segment and storing a base address of the allocated full segment in the segment table using the segment index; and (b) reserving the predetermined amount of memory in the allocated full segment of memory, including generating the data representation of the pointer using the segment index for the allocated full segment.

17. A computer system including an address space with a plurality of memory addresses, each having a predetermined width, the computer system configured to compile a first computer program into a second computer program, the first computer program including a reference to a pointer, the computer system comprising:

(a) a first code generator configured to generate mapping program code that maps a data representation of the pointer to a selected memory address in the address space upon initialization of the pointer during execution of the second computer program, the data representation of the pointer having a predetermined width that is smaller than the predetermined width of the selected memory address; and (b) a second code generator configured to, for each use of the pointer that requires an access to the address space, generate retrieval program code that retrieves the selected memory address using the data representation of the pointer during execution of the second computer program, wherein each use of the pointer that requires an access to the address space is selected from the group consisting of a pointer dereference, a pointer array reference, a pointer structure member reference an assignment of a second pointer in a second data representation, a parameter in a function call, and combinations thereof.

18. The computer system of claim 17 wherein the retrieval program code is configured to access a segment table including a plurality of segment table entries, each segment table entry including a base memory address pointing to one of a plurality of segments in the address space, and wherein the mapping program code is configured to store in the data representation of the pointer an index value associated with a selected one of the segment table entries, and an offset value associated with an offset from the base memory address stored in the selected segment table entry, and wherein the mapping program code is further configured to insert into the segment table a segment table entry with the base memory address of the segment in the address space for the selected memory address.

19. The computer system of claim 18, wherein the processor is further configured to generate memory allocation code configured to allocate memory from the address space for the pointer such that the selected memory address points to the allocated memory.

20. The computer system of claim 19, wherein the memory allocation code operates in response to a memory allocation request for a predetermined amount of memory in the address space, wherein the memory allocation code is configured to allocate full segments of memory as needed and to generate segment indexes therefor pointing to selected segment table entries in the segment table, and wherein the memory allocation code is further configured to reserve a free portion of an allocated full segment for the predetermined amount of memory and to determine an index value for the pointer using the segment index of the allocated full segment.

21. The computer system of claim 17, wherein the processor is further configured to generate pointer arithmetic program code configured to perform an arithmetic operation on the data representation of the pointer during execution of the second computer program, the arithmetic operation selected from the group consisting of a pointer increment, a pointer decrement, and an assignment to a second pointer having the same data representation.

22. The computer system of claim 21, wherein the data representation is an integer data type; whereby the arithmetic operation is performed as an integer operation.

23. The computer system of claim 17, wherein the processor is further configured to optimize the retrieval program code to eliminate redundant retrievals of the selected memory address.

24. A computer system including an address space with a plurality of memory addresses partitioned into a plurality of memory segments, each memory address having a predetermined width, and the address space accessible by a pointer, the computer system comprising:

(a) a memory including a segment table, the segment table including a plurality of segment table entries, each segment table entry including a base address for one of the plurality of memory segments; and (b) a processor, coupled to the memory, the processor configured to access a selected memory address in the address space using a pointer, the processor further configured to:

(1) upon initialization of the pointer, generate a data representation of the pointer that is mapped to the selected memory address in the address space, the data representation of the pointer having a predetermined width that is smaller than the predetermined width of the selected memory address, and the data representation including an index value associated with a selected one of the plurality of segment table entries that includes the base address of the memory segment for the selected memory address, and an offset value associated with an offset of the selected memory address from the base address from the selected table entry;

(2) for each use of the pointer that does not require an access to the address space, perform a predetermined operation on the data representation of the pointer; and (3) for each use of the pointer that requires an access to the address space, generate the selected memory address for the pointer using the data representation thereof by retrieving the base address from the segment table entry indexed by the index value of the data representation, and adding to the base address the offset value from the data representation, wherein each use of the pointer that requires an access to the address space is selected from the group consisting of a pointer dereference, a pointer array reference, a pointer structure member reference, an assignment of a second pointer in a second data representation, a parameter in a function call, and combinations thereof.

25. The computer system of claim 24, wherein the data representation is an integer data type; whereby the predetermined operation is performed as an integer operation.

26. The computer system of claim 24, wherein the predetermined operation is selected from the group consisting of a pointer increment, a pointer decrement, and an assignment to a second pointer having the same data representation.

27. The computer system of claim 24, wherein the processor is further configured to allocate a predetermined amount of memory for the pointer upon initialization of the pointer by:

(a) allocating a full segment of memory in the address space, including determining a segment index for the full segment and storing a base address of the allocated full segment in the segment table using the segment index; and (b) reserving the predetermined amount of memory in the allocated full segment of memory, including generating the data representation of the pointer using the segment index for the allocated full segment.

28. A program product, comprising:

(a) a program configured to perform a method of compiling a first computer program into a second computer program, the first computer program including a reference to a pointer, and the second computer program configured to execute on a computer system including an address space including a plurality of memory addresses, each having a predetermined width, the method comprising:

(1) generating mapping program code configured to generate a data representation of the pointer that is mapped to a selected memory address in the address space upon initialization of the pointer during execution of the second computer program, the data representation of the pointer having a predetermined width that is smaller than the predetermined width of the selected memory address; and (2) for each use of the pointer that requires an access to the address space, generating retrieval program code configured to retrieve the selected memory address using the data representation of the pointer during execution of the second computer program, wherein each use of the pointer that requires an access to the address space is selected from the group consisting of a pointer dereference, a pointer array reference, a pointer structure member reference, an assignment of a second pointer in a second data representation, a parameter in a function call, and combinations thereof; and (b) a signal bearing media bearing the program.

29. The program product of claim 28, wherein the signal bearing media is transmission type media.

30. The program product of claim 28, wherein the signal bearing media is recordable media.

31. The program product of claim 28, wherein the retrieval program code is configured to access a segment table including a plurality of segment table entries, each segment table entry including a base memory address pointing to one of a plurality of segments in the address space, and wherein the mapping program code is configured to store in the data representation of the pointer an index value associated with a selected one of the segment table entries, and an offset value associated with an offset from the base memory address stored in the selected segment table entry, and wherein the mapping program code is further configured to insert into the segment table a segment table entry with the base memory address of the segment in the address space for the selected memory address.

32. The program product of claim 31, wherein the method performed by the program further includes generating memory allocation code configured to allocate memory from the address space for the pointer such that the selected memory address points to the allocated memory.

33. The program product of claim 32, wherein the memory allocation code operates in response to a memory allocation request for a predetermined amount of memory in the address space, wherein the memory allocation code is configured to allocate full segments of memory as needed and to generate segment indexes therefor pointing to selected segment table entries in the segment table, and wherein the memory allocation code is further configured to reserve a free portion of an allocated full segment for the predetermined amount of memory and to determine an index value for the pointer using the segment index of the allocated full segment.

34. The program product of claim 28, wherein the method performed by the program further includes generating pointer arithmetic program code configured to perform an arithmetic operation on the data representation of the pointer during execution of the second computer program, the arithmetic operation selected from the group consisting of a pointer increment, a pointer decrement, and an assignment to a second pointer having the same data representation.

35. The program product of claim 34, wherein the data representation is an integer data type; whereby the arithmetic operation is performed as an integer operation.

36. The program product of claim 28, wherein the method performed by the program further includes optimizing the retrieval program code to eliminate redundant retrievals of the selected memory address.

37. A program product, comprising:

(a) a program configured to perform a method of accessing with a pointer an address space in a computer system including a plurality of memory addresses partitioned into a plurality of memory segments, each memory address having a predetermined width, the method comprising:

(1) upon initialization of the pointer, generating a data representation of the pointer that is mapped to a selected memory address in the address space, the data representation of the pointer having a predetermined width that is smaller than the predetermined width of the selected memory address, and the data representation including an index value associated with a selected one of a plurality of segment table entries in a segment table, the selected table entry including a base address of the memory segment for the selected memory address; and an offset value associated with an offset of the selected memory address from the base address stored in the selected table entry;

(2) for each use of the pointer that does not require an access to the address space, performing a predetermined operation on the data representation of the pointer; and (3) for each use of the pointer that requires an access to the address space, generating the selected memory address for the pointer using the data representation thereof, including retrieving the base address from the segment table entry indexed by the index value of the data representation, and adding to the base address the offset value from the data representation, wherein each use of the pointer that requires an access to the address space is selected from the group consisting of a pointer dereference, a pointer array reference, a pointer structure member reference, an assignment of a second pointer in a second data representation, a parameter in a function call, and combinations thereof; and (b) a signal bearing media bearing the program.

38. The program product of claim 37, wherein the signal bearing media is transmission type media.

39. The program product of claim 37, wherein the signal bearing media is recordable media.

40. The program product of claim 37, wherein the data representation is an integer data type; whereby the predetermined operation is performed as an integer operation.

41. The program product of claim 37, wherein the predetermined operation is selected from the group consisting of a pointer increment, a pointer decrement, and an assignment to a second pointer having the same data representation.

42. The program product of claim 37, wherein the method performed by the program further comprises allocating a predetermined amount of memory for the pointer upon initialization of the pointer, including:

(a) allocating a full segment of memory in the address space, including determining a segment index for the full segment and storing a base address of the allocated full segment in the segment table using the segment index; and (b) reserving the predetermined amount of memory in the allocated full segment of memory, including generating the data representation of the pointer using the segment index for the allocated full segment.

43. A method of compiling a first computer program into a second computer program, the first computer program including a reference to a pointer, and the second computer program configured to execute on a computer system including an address space including a plurality of memory addresses, each having a predetermined width, the method comprising:

(a) generating mapping program code configured to generate a data representation of the pointer that is mapped to a selected memory address in the address space upon initialization of the pointer during execution of the second computer program, the data representation of the pointer having a predetermined width that is smaller than the predetermined width of the selected memory address;

(b) for each use of the pointer that requires an access to the address space, generating retrieval program code configured to retrieve the selected memory address using the data representation of the pointer during execution of the second computer program; and (c) generating memory allocation code configured to allocate memory from the address space for the pointer such that the selected memory address points to the allocated memory.

44. A method of compiling a first computer program into a second computer program, the first computer program including a reference to a pointer, and the second computer program configured to execute on a computer system including an address space including a plurality of memory addresses, each having a predetermined width, the method comprising:

(a) generating mapping program code configured to generate an integer data type data representation of the pointer that is mapped to a selected memory address in the address space upon initialization of the pointer during execution of the second computer program, the data representation of the pointer having a predetermined width that is smaller than the predetermined width of the selected memory address; and (b) for each use of the pointer that requires an access to the address space, generating retrieval program code configured to retrieve the selected memory address using the data representation of the pointer during execution of the second computer program.

45. A method of compiling a first computer program into a second computer program, the first computer program including a reference to a pointer, and the second computer program configured to execute on a computer system including an address space including a plurality of memory addresses, each having a predetermined width, the method comprising:

(a) generating mapping program code configured to generate a data representation of the pointer that is mapped to a selected memory address in the address space upon initialization of the pointer during execution of the second computer program, the data representation of the pointer having a predetermined width that is smaller than the predetermined width of the selected memory address; and (b) for a use of the pointer that requires an access to the address space, generating retrieval program code configured to retrieve the selected memory address using the data representation of the pointer during execution of the second computer program, wherein the use of the pointer that requires an access to the address space is selected from the group consisting of a pointer dereference, a pointer array reference, a pointer structure member reference, an assignment of a second pointer in a second data representation, a parameter in a function call, and combinations thereof.

46. A method of compiling a first computer program into a second computer program, the first computer program including a reference to a pointer, and the second computer program configured to execute on a computer system including an address space including a plurality of memory addresses, each having a predetermined width, the method comprising:

(a) generating mapping program code configured to generate a data representation of the pointer that is mapped to a selected memory address in the address space upon initialization of the pointer during execution of the second computer program, the data representation of the pointer having a predetermined width that is smaller than the predetermined width of the selected memory address;

(b) for each use of the pointer that requires an access to the address space, generating retrieval program code configured to retrieve the selected memory address using the data representation of the pointer during execution of the second computer program; and (c) optimizing the retrieval program code to eliminate redundant retrievals of the selected memory address.

* * * * *